US005537498A

United States Patent [19]

Bausman et al.

[11] Patent Number: 5,537,498

[45] Date of Patent: Jul. 16, 1996

[54] OPTICAL CLOCK DISTRIBUTION SYSTEM

[75] Inventors: Marvin D. Bausman; Vernon W. Swanson, both of Chippewa Falls, Wis.

[73] Assignee: Cray Research, Inc., Eagan, Minn.

[21] Appl. No.: 27,049

[22] Filed: Mar. 5, 1993

[51] Int. Cl.[6] ..................... G02B 6/28; G06F 13/00; H04B 10/12

[52] U.S. Cl. ..................... 385/24; 250/227.28; 327/293; 385/14

[58] Field of Search ..................... 385/14, 15, 24, 385/27, 31, 39, 42–46, 50; 250/227.11, 227.12, 227.28; 327/291–294

[56] References Cited

U.S. PATENT DOCUMENTS

| | | | |
|---|---|---|---|
| 4,422,088 | 12/1983 | Gfeller | 385/37 |
| 4,755,704 | 7/1988 | Flora et al. | 327/152 |
| 4,831,662 | 5/1989 | Kuhn | 359/156 |
| 4,943,136 | 7/1990 | Popoff | 385/46 |
| 4,959,540 | 9/1990 | Fan et al. | 250/227.12 |
| 5,065,454 | 11/1991 | Binz et al. | 327/292 X |
| 5,258,660 | 11/1993 | Nelson et al. | 327/141 |
| 5,293,626 | 3/1994 | Priest et al. | 385/39 X |
| 5,416,861 | 5/1995 | Koh et al. | 385/14 |
| 5,442,475 | 8/1995 | Bausman et al. | 385/24 X |

FOREIGN PATENT DOCUMENTS

87/04306 7/1987 WIPO .

OTHER PUBLICATIONS

*IEEE Design & Test of Computers*, vol. 5, No. 5, Oct. 1988, IEEE, (New York, US), K. D. Wagner: "Clock System Design", pp. 9–27.

*IEEE Journal of Solid-State Circuits*, vol. SC–21, No. 2, Apr. 1986, IEEE (New York, US, E. G. Friedman et al.: "Design And Analysis Of A Hierarchical Clock Distribution System For Synchronous Standard Cell/Macrocell VLSI", pp. 240–246.

*IBM Technical Disclosure Bulletin*, vol. 26, No. 4, Sep. 1983, IBM Corp., J. T. Brady, "Low Skew Fiber–Optic Clock Distribution System", p. 2143.

*Optical Engineering*, vol. 25, No. 10, Oct. 1986, Bell Communications Research, Davis H. Hartman, "Digital High Speed Interconnects: A Study of the Optical Alternative", pp. 1086–1102.

*Journal of Lightwave Technology*, vol. 1t–4, No. 1, Jan. 1986, IEEE, Davis H. Hartman et al., "An Effective Lateral Fiber–Optic Electronic Coupling and Packaging Technique Suitable for VHSIC Applications", pp. 73–82.

(List continued on next page.)

*Primary Examiner*—John D. Lee

*Attorney, Agent, or Firm*—Schwegman, Lundberg, Woessner & Kluth

[57] ABSTRACT

A clock distribution system minimizes clock skew in the distribution of clock signals to individual circuit board components in a highly synchronous, high speed computer system. The clock system includes an optical subsystem and an electrical subsystem. The optical subsystem utilizes multiple lasers and an n×n passive star coupler to introduce clock redundancy into the system. The lengths of the optical distribution fibers are controlled such that they are of equivalent optical path length. Once delivered to the logic assemblies, the optical clock signals are converted into equivalent electrical clock signals. The electrical subsystem then distributes the converted electrical clock signals to individual circuit board components over equalized fanout paths such that the skew as seen by the individual components is minimized. The system also compensates for skew introduced by the receiver and fanout electronics by tuning the length of the fiber. The electrical subsystem further includes means for customizing the fanout to fit individual circuit boards such that extraneous system noise is reduced. The overall clock system results in a maximum clock distribution network skew of approximately ±100 picoseconds, thus reducing or eliminating the need to perform electrical deskew at the individual circuit board components.

20 Claims, 6 Drawing Sheets

OTHER PUBLICATIONS

*Journal of Lightwave Technology*, vol. 1t–3, No. 4, Aug. 1985, IEEE, Davis H. Hartman et al., "A Monolithic Silicon Photodetect/Amplifier IC for Fiber and Integrated Optics Application", pp. 729–738.

*Computers and Signal Processing*, Jun. 4–5, 1987, IEEE, David Dodds et al., "Point to Point Clocking for FDDI Fiber Optic Data Rings", pp. 323–326.

*Electronics Letters*, Jun. 4, 1987, P. R. Prucnal et al., "Fibre–Optic Network Using All–Optical Processing", pp. 629–630, vol. 23, No. 12.

*Optical Engineering*, vol. 25, No. 10, Oct. 1986, Bradley D. Clymer et al., "Optical Clock Distribution to Silicon Chips", pp. 1103–1108.

*Optical Engineering*, vol. 25, No. 10, Oct. 1986, D. Z. Tsang et al., "A Technology for Optical Interconnections Based on Multichip Integration", pp. 1127–1131.

*IEEE Spectrum*, Mar. 1987, Lynn D. Hutcheson et al., "Optical Interconnects Replace Hardwire", pp. 30–35.

*Optical Engineering*, vol. 25, No. 10, Oct. 1986, P. R. Haugen et al., "Optical Interconnects for High Speed Computing", pp. 1076–1085.

*Proceedings of the IEEE*, vol. 72, No. 7, Jul. 1984, Joseph W. Goodman et al., "Optical Interconnections for VLSI Systems", pp. 850–866.

*Electronics and Photonics Laboratory*, Feb. 27, 1987, GTE Laboratories Incorporated, "High Speed Optoelectronic Data Link Phase 0 Study", pp. 1–156.

*Optical Interconnect Applications and Receiver Design Concepts*, Sep. 1986, Bell Communications Research.

"Final Report: Optical Clock Distribution System" Contract No. MDA 904–82–C–0422, presented to Maryland Procurement Office, Fort George G. Meade, Maryland, prepared by Davis H. Hartman, published by Motorola, Inc., Government Electronics Group. Basics of PIN and Photoconductor Detectors published by Motorola, Inc. (Date no available).

Series of Overheads published by Motorola, Inc., Semiconductor Sector, Bipolar Technology Center. (No Dates).

100
101
104a
104b
102
116
106b
112
118
108
108
110
106a
EXT
114
120
OPTICAL
TO DIGITAL
CONVERTER
126
122
103
140
124
132
300
136
133

OPTICAL CLOCK DISTRIBUTION SYSTEM

FIELD OF THE INVENTION

This invention relates to an apparatus and method of distributing clock signals in high speed computer systems.

BACKGROUND

In computer systems, a system clock signal is distributed throughout the system as a reference signal to control the timing of events. The use of a reference clock simplifies the design of data transfer structures within the computer since they can be designed to operate synchronous to the system clock. Synchronous designs are easier to conceptualize and to partition.

System clock signals are typically distributed from a single source point to various destination points within the computer system, which may be located some distance apart. In complex, high performance data processing systems such as those manufactured by Cray Research, Inc., the assignee of the present invention, the clock frequency is high and the number of points to which the system clock is provided is large. In art systems, high frequency clock signals were typically distributed as electrical signals sent point-to-point from the source to the destination. These electrical point-to-point distribution systems have several disadvantages. Point-to-point connections made in this manner act as individual antennae radiating radio frequency (RF) energy, adding to system noise and significantly affecting reliability. Also, signals distributed by this means do not arrive at all destination points at exactly the same time. The differences in time between these arrivals is called skew.

Within a computer system, data is passed from register to register, with varying amounts of processing performed between registers. Registers store data present at their inputs either at a system clock transition or during a phase of the system clock. Skew in the system clock signal impacts register-to-register transfers, i.e., it may cause a register to store data either before it has become valid or after it is no longer valid.

On slower computer systems, skew is usually a small portion of the clock period. Its impact can be reduced by adding delay to the data path. However, on high performance data processing systems such as supercomputers manufactured by Cray Research, Inc., the same amount of clock skew may be a substantial portion of the clock period and may actually limit the speed at which the computer system can operate. In addition, the amount of delay that can be added to a data path is limited. Therefore a skew becomes a major design factor in the transfer of data in high speed computing systems.

Clock skew is caused by a number of factors. A typical path for an electrical clock signal will include interconnections between circuit boards, fanout gates, circuit boards foil paths, and integrated circuit (IC) interconnect metal. Each of these interconnections provides an opportunity for introducing undesired clock skew.

Another source of clock skew is varying signal path lengths in the clock distribution network. The amount of time it takes a signal to travel along a wire, foil path, or interconnect metal is called its electrical path length and is dependent upon physical length and capacitance. All else being equal, a signal will take longer to travel a long path than a short one. If the electrical path lengths of all the clock signal paths are not equal, skew is introduced.

Another major source of clock skew is due to the integrated circuits that drive the clock signals. In a typical system the clock signal is distributed to a limited number of clock fanout devices on a circuit board. These clock fanout devices in turn distribute the clock signal to the remaining integrated circuits on the board. There will always be differences in propagation delay between fanout devices. Some reasons for these differences are variations in the semiconductor manufacturing process, temperature and voltage. Propagation delay differences between fanout devices further increases clock skew. In addition, in systems where there are a large number of integrated circuits, two or more levels of fanout devices may be needed to provide a clock signal to all of the registers in the system. Each level of fanout has the potential of adding additional skew to the system clock signal.

Crosstalk from adjacent signals, coupled RF interference and power and ground noise also act to increase clock skew in electrical clock distribution systems. For example, if a signal's voltage level is altered by crosstalk, the point in time when the signal is determined to have changed from a high to a low level will be altered, thus introducing clock skew.

As system clock periods shrink there is increasing pressure on the computer architect to reduce indeterminism in the system design. Clock skew, like setup time, hold time and propagation delay, increase the amount of time that data is in an indeterminable state. System designers must be careful that this indeterminable state does not fall within the sampling window of a register in order to preserve data integrity. In art systems, data path delay was often used to move the location of the indeterminable state outside the sampling window. However, as clock frequencies approach 500 MHz and go beyond, the ability to position the indeterminable state becomes more difficult. As a result clock skew reduces the ability to increase the system clock frequency.

Several techniques have been used in clock distribution networks in an attempt to reduce clock skew. System designers attempt to equalize the wire, foil path, and interconnect metal lengths between the clock source and all destinations. This helps to reduce variation in the electrical path length due to physical length. However, since each path may have a different impedance and/or capacitance, it is difficult to truly match electrical path length.

Methods are well known in the art for minimizing crosstalk, shielding signals and providing more stable temperature and voltage references. Likewise, variation in propagation delay between fanout devices can be controlled to a degree. This can be done by mandating stringent screening requirements or by matching components during assembly. However, the former drives up the price of the devices while the latter drives up the manufacturing costs. Again, truly matched performance is difficult to achieve because of the different loads and impedances faced by each device.

Clock distribution network tuning is a different approach at reducing the effects of clock skew. Delay is added selectively to clock paths in an attempt to equalize the delay through each of the paths. A representative tuning strategy is disclosed in the co-pending and commonly assigned patent application Ser. No. 07/465,947 filed Jan. 16, 1990 by Stephen E. Nelson et al. entitled "CLOCK DISTRIBUTION SYSTEM AND METHOD", now U.S. Pat. No. 5,258,660, which application is incorporated herein by reference. That application discloses the use of selectable delay paths to tune clock signal paths to compensate for clock skew.

Optical clock distribution networks have been proposed as a viable alternative to electrical clock distribution networks. Optical fiber as a transmission medium provides numerous advantages. Optical fiber provides a noise-free signal transmission environment, is resistant to electromagnetic interference, generates no electromagnetic interference which could initiate crosstalk, and supports very high transmission rates. However, in optical clock systems proposed to date, high frequency clocks with minimal skew have been difficult to achieve.

The effectiveness and practicality of the methods discussed above varies. It is clear that there has existed a long and unfilled need in the art for a clock distribution method and apparatus capable of reducing clock skew. The present invention solves these and other shortcomings of the techniques known in the art.

An additional shortcoming of existing electrical or optical network tuning schemes is that although the distribution network may be tuned to eliminate some degree of clock skew, the receiver and fanout electronics necessary to distribute the clock signals to individual circuit board components introduce additional skew which is not accounted for by tuning the distribution network. Because these tuning strategies do not tune all the way to the individual circuit board components, their ability to effectively minimize clock skew is significantly limited.

Because of the above discussed deficiencies, it is clear that there has existed a long and unfilled need in the art for a clock distribution system capable of reducing clock skew to the degree that system clock frequencies of 500 MHz to 1 GHz and beyond can be attained. The present invention solves these and other shortcomings of the techniques known in the art.

SUMMARY

To overcome the limitations in the art discussed above, and to overcome other limitations readily recognizable to those skilled in the art, this invention provides a clock distribution system and method for highly synchronous high speed computer systems. The system distributes deskewed electrical clock signals in multiple copies from a single optical source, with minimal skew between all distributed signals. The system includes an optical subsystem for distributing the clock signal in optical form to a plurality of circuit boards, and an electrical subsystem for distributing the clock signal to individual circuit board components. The optical subsystem employs multiple lasers and an n×n passive optical coupler at the source end to introduce clock redundancy for equipment protection into the system. The physical lengths of the optical clock distribution paths from the source output to the circuit boards are tuned so that their optical path lengths are equivalent.

Providing the interface between the optical and electrical subsystems are optical-to-electrical converters located on each circuit board which convert the received optical clock signal to an equivalent electrical clock signal.

The electrical subsystem includes a clock distribution fanout circuit on each circuit board to distribute the converted electrical clock signals to individual circuit board components. Each fanout circuit is in the preferred embodiment a generic circuit chip which is used to distribute a converted optical clock signal to a matrix of circuit board components, such as logic gate arrays. The clock outputs on the fanout circuit can be turned on or off so that one generic clock fanout circuit can be used with a wide variety of circuit boards requiring different numbers of clock outputs. An H-pattern fanout and tree structure is used in the preferred embodiment to ensure that all path lengths from the input clock signal to any output clock signal will be of equivalent length in order to reduce clock skew between output clock signals. The fanout circuit is also designed so that the physical lengths of the fanout paths from the fanout circuit inputs all the way to the individual circuit board components are equalized to further minimize clock skew. The system also compensates for electrical clock skew induced by the receiver and fanout electronics by probing the output of the clock fanout circuit and deskewing the electronics by tuning the length of the optical clock distribution fiber.

The entire clock distribution system results in a maximum network skew of approximately ±100 picoseconds, thus reducing or eliminating the need to perform electrical deskew at the individual circuit board components and allowing system clock speeds of 500 MHz to 1 GHz and beyond to be achieved.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration of a specific embodiment in which the invention may be practiced. It is to be understood that other embodiments may be utilized and structural changes made without departing from the scope of the present invention.

The preferred embodiment of the clock distribution system includes both an optical subsystem and an electrical subsystem. The optical subsystem includes an optical fiber network which transmits optical clock signals to a plurality of circuit boards or logic assemblies. At the logic assemblies, the optical clock signals are converted into equivalent electrical clock signals. The electrical subsystem includes a fanout circuit which distributes the converted electrical clock signals to individual circuit board components. The optical clock system reduces distribution network skew to ±100 picoseconds, thus reducing or eliminating the need to perform electrical deskew at the logic assemblies and allowing system clock speeds of 500 Mz to 1 GHz and beyond to be achieved.

Figure 1:
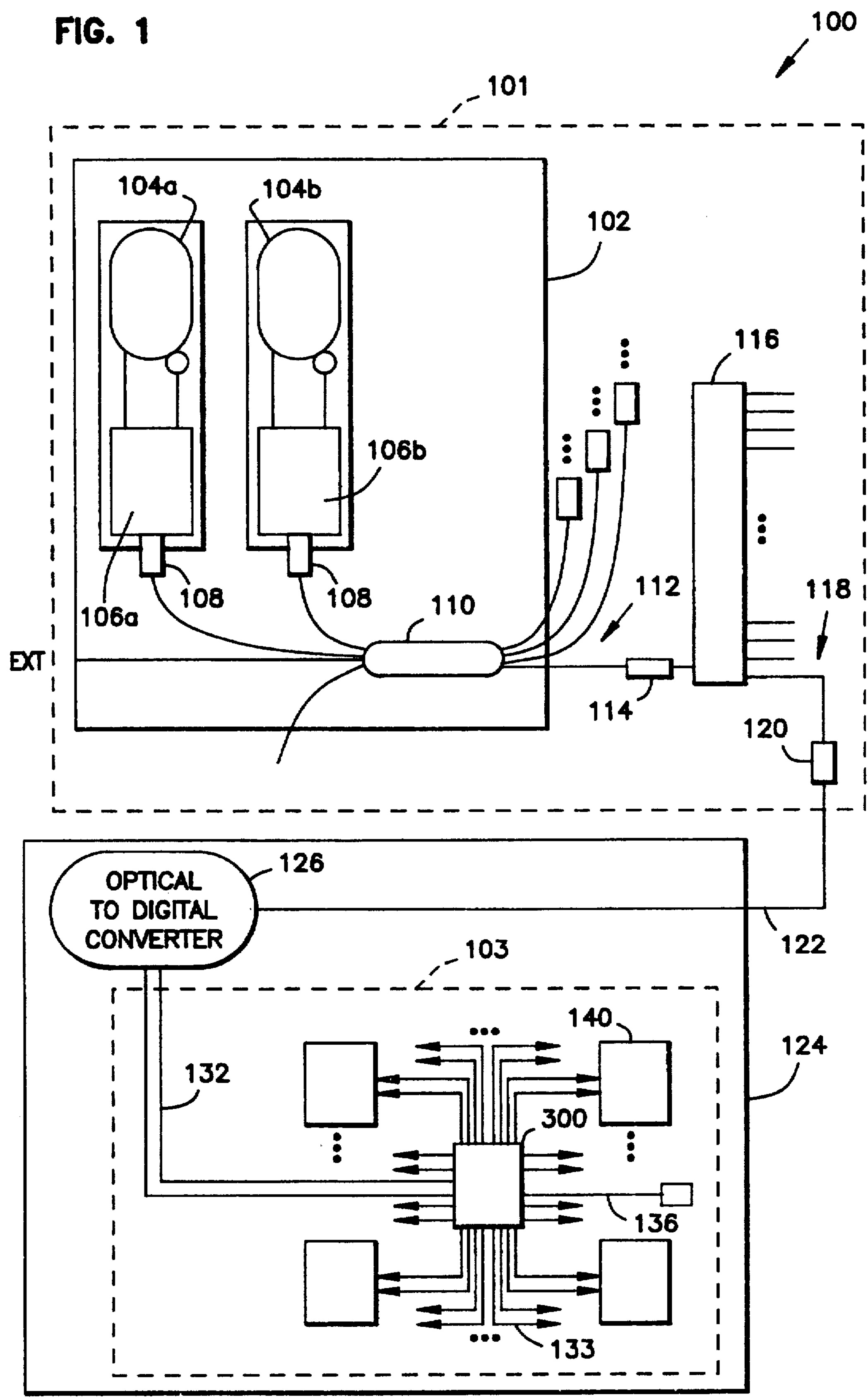
FIG. 1 shows a block diagram of the clock system described herein, including the optical and electrical subsystems.

FIG. 1 is a block diagram of the clock system of the present invention. The clock system includes an optical subsystem 101 and an electrical subsystem 103 interfaced by an optical-to-digital converter 126. In the optical subsystem 101, the system clock is generated by two electronic oscillators 104*a* and 104*b*, connected to lasers 106*a* and 106*b*, respectively. The two oscillator-laser transmitter pairs are set up in a primary/secondary configuration, in which only the primary oscillator-laser transmitter pair is active and generating the system clock at any one time. The use of two laser transmitters results in clock source redundancy, so that if the primary clock laser fails, the system can recover using the secondary clock laser without losing a great deal of computer run time. This avoids the need to down the computer for an extended time to replace the laser. If the active laser should fail the failed laser is switched off and the spare laser is switched on by software control via a maintenance control channel. Optically, the primary and secondary laser outputs are passively routed into the distribution network using a n×n star coupler 110. The failed laser then can be physically replaced during a scheduled maintenance time. Introducing this clock redundancy avoids a significant amount of computer down time.

Referring again to FIG. 1, from laser 106, the optical clock signal travels over the appropriate optical fiber 108 to an n×n passive optical star coupler 110. n×n star coupler 110 is a passive device having n optical inputs and n optical outputs. The n×n star coupler 110 receives the output of the active laser diode and transmits 1/n of the light produced to each of the n optical output fibers 112. The n×n star coupler 110 also provides for the previously mentioned passive optical input switching between the primary and secondary laser sources. In the preferred embodiment of the present invention, n×n star coupler 110 is a 4×4. However, those skilled in the art will readily recognize that any appropriately sized coupler could be substituted for the particular 4×4 star coupler described herein without departing from the scope of the present invention.

Also in the preferred embodiment, one or more of the input fibers 108 to star coupler 110 can be configured as an external optical connection. Such a configuration enables optical test signals to be input into the system for equipment testing, diagnostics, and the like.

The optical clock signals on output fibers 112 are transmitted through an associated 1×m tree coupler 116 to be distributed to individual circuit boards located throughout the machine. 1×m tree couplers 116 transmit approximately 1/m of the light received from fibers 112 through each of the m output fibers 118 for distribution of the optical clock signal to a respective circuit board 124. In the preferred embodiment of the present invention, 1×m tree coupler 116 is a 1×32. However, those skilled in the art will readily recognize that if the optical clock signal is to be sent to a greater or lesser number of destinations within the computer system, a 1×m tree coupler having more or fewer outputs could be substituted for the 1×32 tree coupler described and shown herein, or a different combination of n×n star couplers and 1×m tree couplers could be used to arrive at the appropriate number of outputs without departing from the spirit or scope of the present invention.

To provide an interface between the optical and electrical subsystems, an optical-to-digital converter 126 located on each circuit board 124 receives the optical clock signal and outputs an equivalent electrical differential clock signal onto PCB traces 132. The preferred embodiment makes use of differential electrical signals; however, the use of differential signals is not necessary in the present invention, and non-differential signals could be used without departing from the scope of the present invention. The electrical subsystem 101 includes clock distribution fanout circuit 300 which receives the electrical clock signal and distributes it in multiple copies to the individual circuit board components 140 such that the skew seen by all the individual circuit board components is minimized. Generally, fanout circuit 300 equalizes the distribution paths between each individual circuit board component. In addition, the paths from each output of fanout circuit 300 to each circuit board component are equalized as well to further minimize clock skew. Clock distribution fanout circuit 300 is described in more detail below in connection with FIGS. 3–5.

Clock skew does not become a major design problem until the system clock frequency approaches 500 MHz. The computer system on which the present optical clock system is used is designed to operate at clock frequencies of 500 MHz to 1 GHz and above. Thus, clock skew is an important design problem in such a computer system. The preferred embodiment of the present invention results in a maximum clock skew of ±100 picoseconds or less in the clock distribution network, as measured from the output of the optical source 102 to the inputs to individual circuit board components 140, thus permitting use of a 1 GHz system clock speed (1 nanosecond clock period) on a large synchronous digital machine and even sub-nanosecond clock periods in appropriate applications.

The present invention incorporates several different but complementary mechanisms by which clock skew from the output of clock source 102 to the individual circuit board components 140 is reduced. These preferably include, but are by no means limited to, the use of optical fiber as a transmission medium, tuning the optical path lengths of the distribution fibers, ensuring that the physical lengths of the clock distribution fanout paths to the individual circuit board components are equivalent, using differential transmission of electrical clock signals, and compensating for electrical clock skew introduced by the circuit board fanout electronics by further tuning the length of the fiber.

Optical Fiber as a Transmission Medium

As stated herein previously, optical fiber as a transmission medium provides numerous advantages over electrical transmission methods. Optical fiber provides a noise free signal transmission environment, is resistent to electromagnetic interference, does not generate electromagnetic radiation, and supports very high transmission rates. Optical fibers also do not radiate RF energy as do their electrical counterparts. The use of optical fiber permits greater control of path length from the clock source to the logic assemblies. Thus, optical fiber is inherently free of many of the skew inducing properties of equivalent electrical distribution methods.

Alternate preferred embodiments of the present invention make use of either multimode or single mode optical fiber. Although multimode optical fiber offers greater coupling tolerances than does a corresponding single mode fiber, both multimode and single mode fiber could be used successfully in the distribution network of the present invention.

The star coupler 110 and tree coupler 116 are in the preferred embodiment monolithic glass passive optical couplers manufactured with an ion exchange process such as that produced by the Fiber Optic Component Division of Corning France located in Cedex, France, which provide a relatively uniform distribution of the optical clock signal.

Because the rise and fall time of the photodetector in converter 126 is a function of amplitude, a large amplitude signal will pass through the threshold voltage more rapidly than a small amplitude signal. Couplers 110 and 116 must therefore be fairly uniform in their ability to split incident light into relatively equal portions. If they are not, this will be evident in the output frequency of converter 126, because a large amplitude optical signal will produce an electrical signal with a longer pulse width than a corresponding lower amplitude optical signal. The Corning process causes changes in the index of refraction of a piece of glass which create waveguides in the fiber couplers that match up very well with the optical fibers connected thereto. The result is a coupler that reproduces optical clock pulses uniformly and with minimal distortion.

In the preferred embodiment of the present invention, tree coupler 116 is a Corning MGC 3210 Monolithic Glass Coupler, and star coupler 110 is a Corning MST17-GG99-0404 Monolithic Glass Coupler. It shall be understood, however, that other couplers available from other companies could be substituted for the specific Corning couplers described with respect to the preferred embodiment without departing from the scope of the present invention.

Fiber Optic Tuning

The preferred clock system embodiment also utilizes tuning of the fiber optic distribution paths in the optical subsystem as a means to reduce clock skew. The tuning of the optical path lengths of the fibers is achieved in the following manner. The individual fiber clock distribution paths are conceptually and physically divided into three segments for tuning purposes. The first segment begins at the output of lasers 106, includes star coupler 110 and ends at fiber coupling 114. The second segment extends from fiber coupling 114, includes tree coupler 116 and terminates at fiber coupling 120. The third and final segment begins at fiber coupling 120 and terminates at the electrical outputs of clock distribution fanout chip 300. The preferable physical location of fiber couplings 114 and 120 are in the chassis of the computer system; however it will be understood that their precise physical location is irrelevant for purposes of the present invention.

The purpose of dividing the distribution fiber paths into three segments is for convenience of tuning the optical and physical path lengths of the optical distribution fiber/component assemblies. The physical lengths of the distribution fiber/component assemblies in the first segment are tuned to a first reference fiber such that their optical path lengths are equivalent to the first reference fiber's optical path length. The physical lengths of fiber/component assemblies in the second segment are tuned to a second reference fiber so that their optical path lengths are equivalent to the second reference fiber's optical path length. The third segment is tuned by probing the electrical output of clock distribution fanout circuit 200 at probe point 136, comparing to a third reference fiber and tuning optical fiber 122 to compensate for clock skew introduced by the converter 126 and fanout circuit 300 electronics.

Tuning the three segments as described above to reference path lengths allows for off-the-shelf replacement of the optical distribution fiber/component assemblies in the event of breakage. In art tuning systems, the electrical or optical distribution path lengths were tuned to each other but not to a reference length. Thus, any tuning performed was unique to a particular machine and to a particular fiber path. If one of the paths in such a machine required replacement, the replacement path would have to be tuned before the system could be restarted. Because the paths in the system of the present invention are tuned to reference fibers, stock replacement fibers can be produced and stored for future use. The stock replacement fiber/component assemblies are simply inserted into the appropriate distribution path with no tuning required. The present invention therefore avoids the need to retune replacement fiber/component assemblies every time a fiber/component assembly is replaced and thus substantially reduces system down time.

Figure 2:
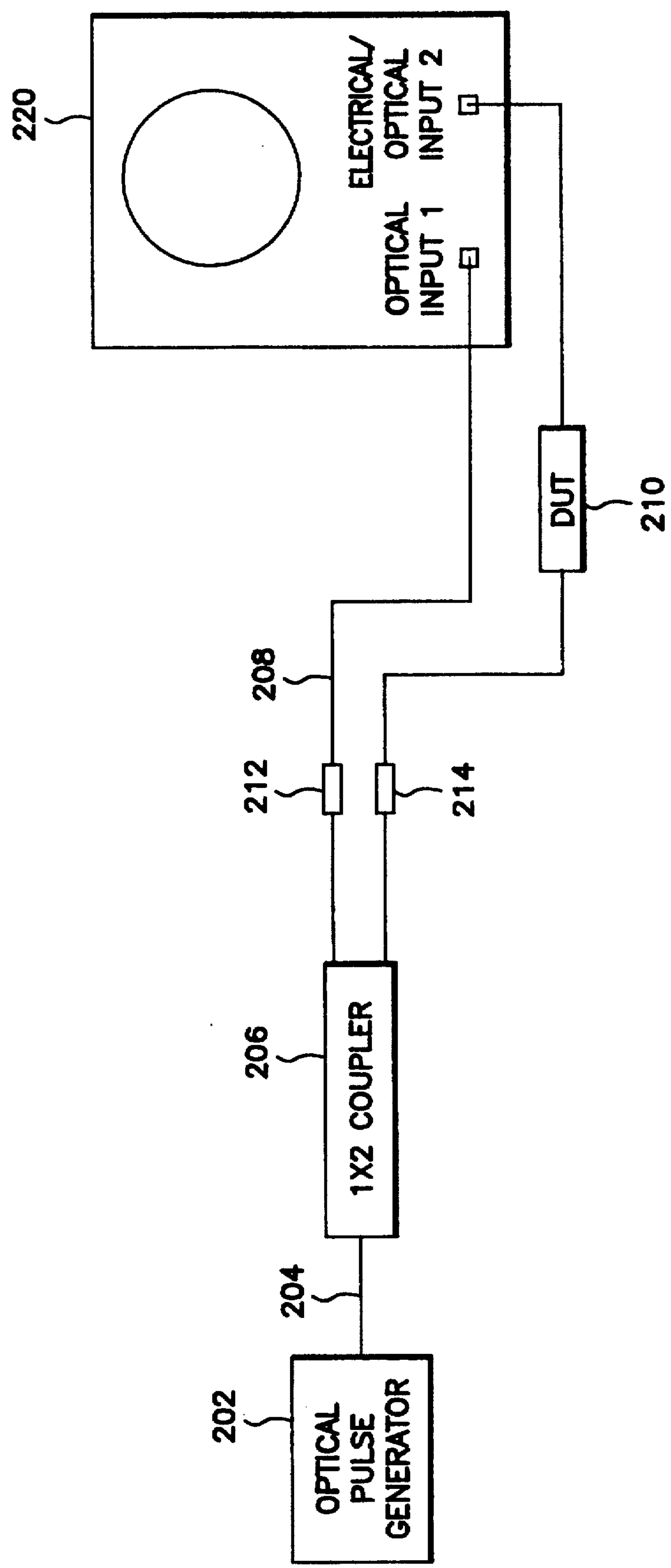
FIG. 2 shows the set-up for measuring and tuning the optical path length of a fiber by comparing it to a reference optical path length.

The three segments are tuned using the measurement setup as shown in FIG. 2. Optical pulse generator 202 generates an optical pulse train, wherein the pulses have a rise time of less than 50 picoseconds. These optical pulses travel over fiber 204 to 1×2 coupler 206 whose output fibers have a known (through measurement) optical path length difference. One output of coupler 206 is optically connected through optical splice 212 to a reference fiber 208. Each segment in the optical clock network of the present invention is cut to be of equivalent optical path length to a particular reference fiber. For example, all fiber or component assemblies in the first segment are tuned to a first reference fiber, and all fiber or component assemblies in the second segment are tuned to a second reference fiber as discussed above. The other end of reference fiber 208 is connected to a first optical input on oscilloscope 220.

The length of fiber or component assembly under test 210 is connected between the second output of coupler 206 through optical splice 214 and a second optical input on oscilloscope 220. The difference between the optical path length of the fiber or component assembly under test 210 and the reference fiber 208 is displayed on oscilloscope 220 as a temporal difference between the two signals. The physical length of the fiber or component assembly under test can then be tuned appropriately until the two signals are temporally identical. When the two signals are temporally identical the optical path length of the fiber or component assembly under test is equivalent to the reference optical path length.

Due to the very small time period of the system clock of the present invention (1 nanosecond at a clock frequency of 1 GHz), and the associated very small amount of skew with which such a system can operate effectively, oscilloscope 220 used to measure the optical path lengths of the fibers must have the ability to measure and display very small time intervals. One such suitable oscilloscope is the Tektronix 11,000 Series digital oscilloscope model CSA803. This oscilloscope has the ability to measure the optical path length of a fiber to well within 10 picoseconds. The oscilloscope also has optical as well as electrical inputs for ease of displaying, measuring and comparing optical and electrical signals. As a result, the skew due to the optical fiber portion of the distribution system is reduced to ±30 picoseconds (10 picoseconds for each of the three fiber segments). It shall be understood, however, that the degree of accuracy to which the optical path lengths can be measured and the resulting clock skew is not a factor of the present invention itself, but rather is limited by present measurement equipment technology. As equipment can measure smaller and smaller time periods, the accuracy of optical path length matching possible with the present invention will substantially increase.

Fanout Circuit

Figure 3:
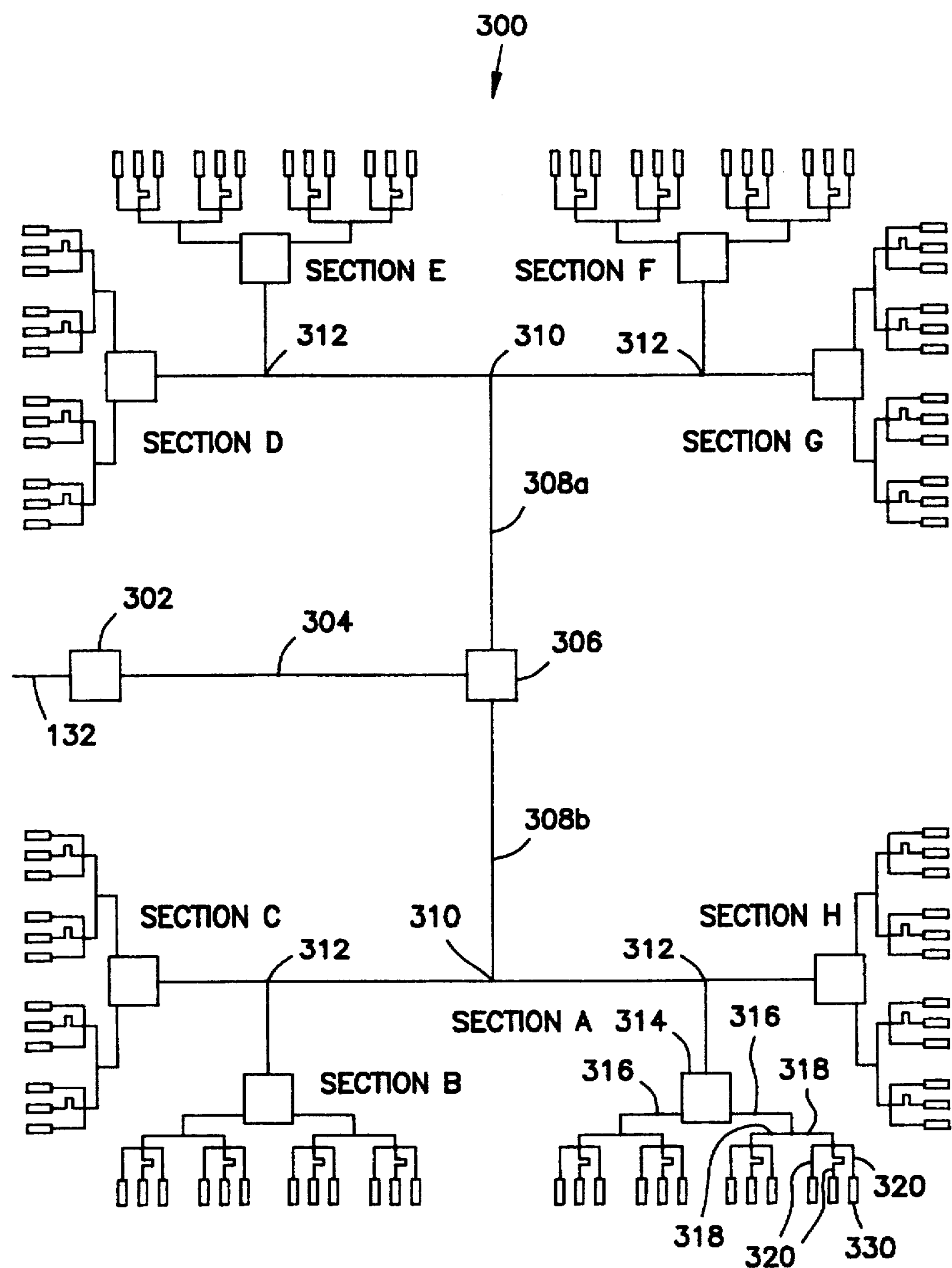
FIG. 3 illustrates the H-pattern fanout distribution structure of the fanout circuit that is a part of the electrical subsystem.

FIG. 3 shows the preferred H-pattern fanout tree distribution structure of the clock distribution fanout circuit 300 that is a part of the electrical subsystem. The fanout circuit reduces clock skew by implementing an H-pattern distribution structure to ensure that all path lengths from the clock input 132 to any clock output cell 330 are substantially equivalent. The goal, of course, is to ensure that the electrical path lengths are equalized so that minimal clock skew is encountered at the individual circuit board components. Those skilled in the art will readily recognize that the physical path length and electrical path length almost always track one another. In the case where the physical path length and the electrical path length do not track, due to such factors as capacitance variations, metal impurities in the path material, etc., one must ensure that all electrical paths are equal. It shall be understood that to make all electrical path lengths equal may necessarily require some physical paths be of unequal physical length.

In operation, the fanout circuit 300 of the preferred embodiment receives the converted optical clock signal as a differential ECL clock signal at clock input cell 302. Clock input cell 302 performs any required level shifting, provides ESD protection, amplifies the differential signals and drives them inward towards the center of circuit 300. The output of the differential input cell 302 is routed to the master clock driver 306 located at the center of the die.

Once at the center of the die the clock signal enters four identical clock drivers (not shown) which have their output clock signals ganged together. Master clock arrivers of this type, as well as clock input cell 302, are commonly known to those skilled in the art and are commonly available from a variety of vendors. The signal is then sent in opposite directions along lines **308*a* and 308*b*. This initial split of the clock signal at master driver 306 forms the center bar of an H-pattern. Two splits 310 at the end of lines 308*a* and 308*b* form the vertical side bars of the H-pattern to deliver the signal to the center of each of four quadrants of the die. The signal is again split at locations 312 to provide the clock signal to eight sections of the die (sections A–H) as shown in FIG. 3**.

The clock signal is received at the eight relay drivers 314, each of which is located at one of the eight sections of the die. Relay drivers 314 are differential amplifiers as are all of the cells which drive the clock signals in the clock distribution circuit 300 of the preferred embodiment of the present invention. Relay drivers 314 consist of four unit cells ganged together and are of a type commonly known and widely available. The outputs of relay drivers 314 are also ganged together and distributed to twelve clock output cells 330 per section (A–H). In order to split and fanout the output of relay drivers 314 to twelve unit receivers 330 equally the signal is split into two lines 316 and then again into two more lines 318. This yields four lines on the fanout from clock output cell 214, each of these lines are then split into a fanout of three 330 resulting in the total of twelve fanout lines and twelve output cells per section in the preferred embodiment.

The total number of outputs available on the preferred embodiment of the present invention as particularly described herein is 96 (8 sections times 12 outputs per section equals 96 outputs). However, many alternate preferred embodiments having a greater or lesser number of clock outputs are possible without departing from the spirit or scope of the present invention. For example, the split from lines 318 to 330 could also be a 1:2 split instead of the 1:3 split described herein, depending upon the number of clock outputs that are required for the logic modules. Those of skill in the art will realize that a wide infinite variety of other configurations could also be realized.

Compensation Tuning

The clock distribution circuit 300 of the present invention also enables minimization of clock skew all the way to individual circuit board components.

Figure 6:
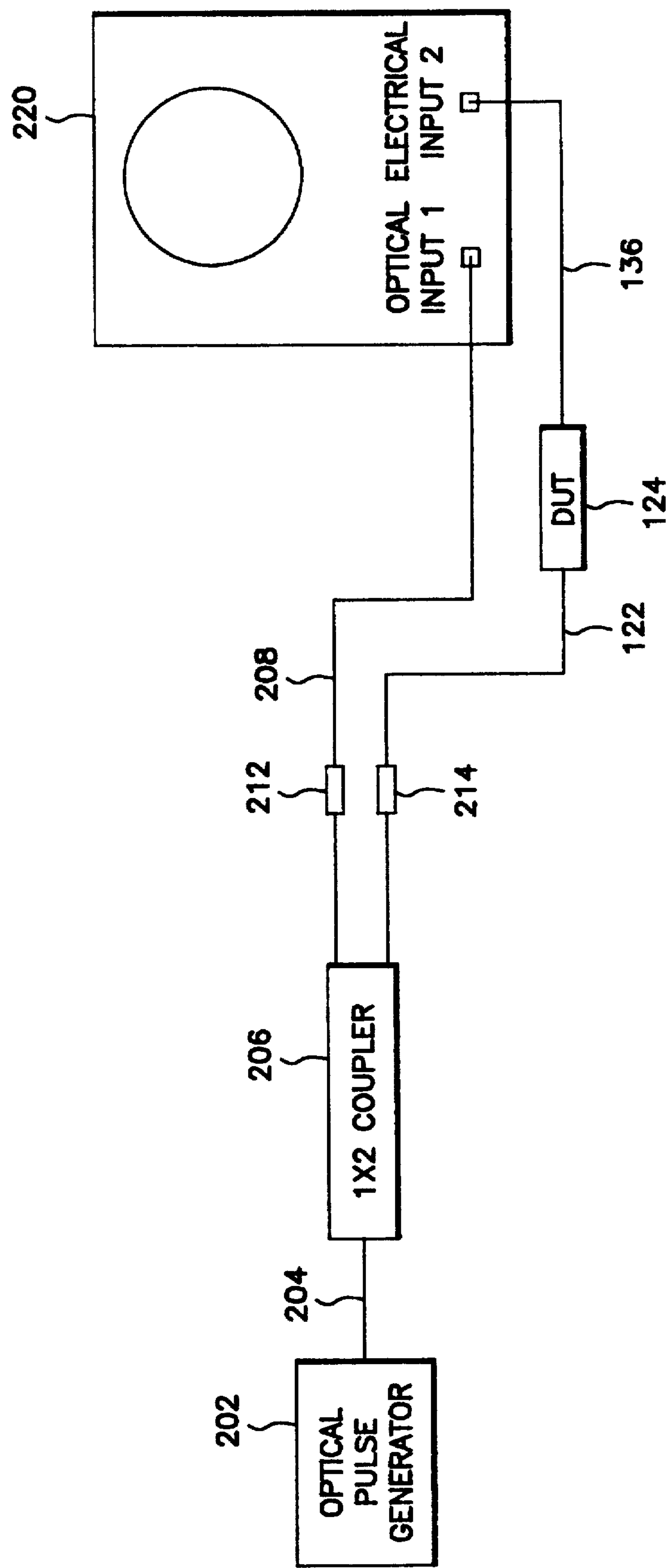
FIG. 6 shows one possible configuration for measuring and tuning the optical path length of a component in the present system.

Referring again to FIG. 1, one test point 136 on circuit 300 is provided for deskewing the fanout electronics by tuning the length of fiber segment 122. This is accomplished by connecting fiber 122 and circuit board assembly 124 as the device under test 210 in FIG. 2. The resulting setup is shown in FIG. 6.

Fiber 122 is connected to the second output of the coupler 206 using optical splice 214 and by connecting the electrical output of test point 136 to an electrical input to the oscilloscope 220. The electrical output of test point 136 and the optical output of reference fiber 308 are displayed on oscilloscope 220 and temporally compared. Fiber 122 is then trimmed to make the output of test point 136 temporally match the optical reference signal. This results in a system that is deskewed to the clock distribution fanout circuit 300 outputs. The physical path lengths of the circuit board traces 133 from circuit 200 to the individual circuit board components 140 are also designed to be equivalent, thus the overall clock distribution paths are deskewed all the way from the optical source to the individual circuit board components.

Variable Outputs

In addition to its skew minimizing capabilities, the electrical subsystem can be customized to fit a wide variety of individual circuit boards. The fanout circuit 300 is in the preferred embodiment a generic clock distribution and fanout chip for distributing a clock signal to a variable number of outputs, dependent on the number of components on the particular circuit board with which a particular distribution circuit is used. A fanout circuit 300 can thus be customized for each circuit board for purposes of reducing system noise. For example, while a CPU board might require 80 clock outputs, an I/O board might require only 60. To minimize system noise which would result if all clock outputs remained active while only a subset of the total number of outputs were in use, each fanout circuit 300 has the capability to disable or turn off unused outputs to a steady state voltage level.

This ability is provided by three types of clock output cells 330.

The first type of clock output cell 330 is the null or load receiver which simply provides an input load to balance the fanout of the clock relay drivers 314. The outputs of this type of output cell 330 do not connect to any output driver. The second type of output cell 330 is a differential relay amplifier which outputs a differential signal to an output driver. The third type of output cell is a differential 2–1 multiplexor used to configure any undesired outputs into a steady state condition (as described herein below). The differential clock signal outputs of this cell can be enabled or disabled as needed depending on the number of clock outputs a particular logic card on which a particular clock distribution circuit is placed.

The null or load type output cell is used if the number of clock outputs will never equal the maximum number of available outputs (96 as in the illustrative preferred embodiment as described and shown herein). These null cells are present simply to balance the load as seen by all the clock outputs and are never used to drive a clock signal.

The second type of output cell is always used to drive a clock output. Their number is determined by the minimum number of clock outputs which are required by a particular circuit board or logic assembly.

Figure 4:
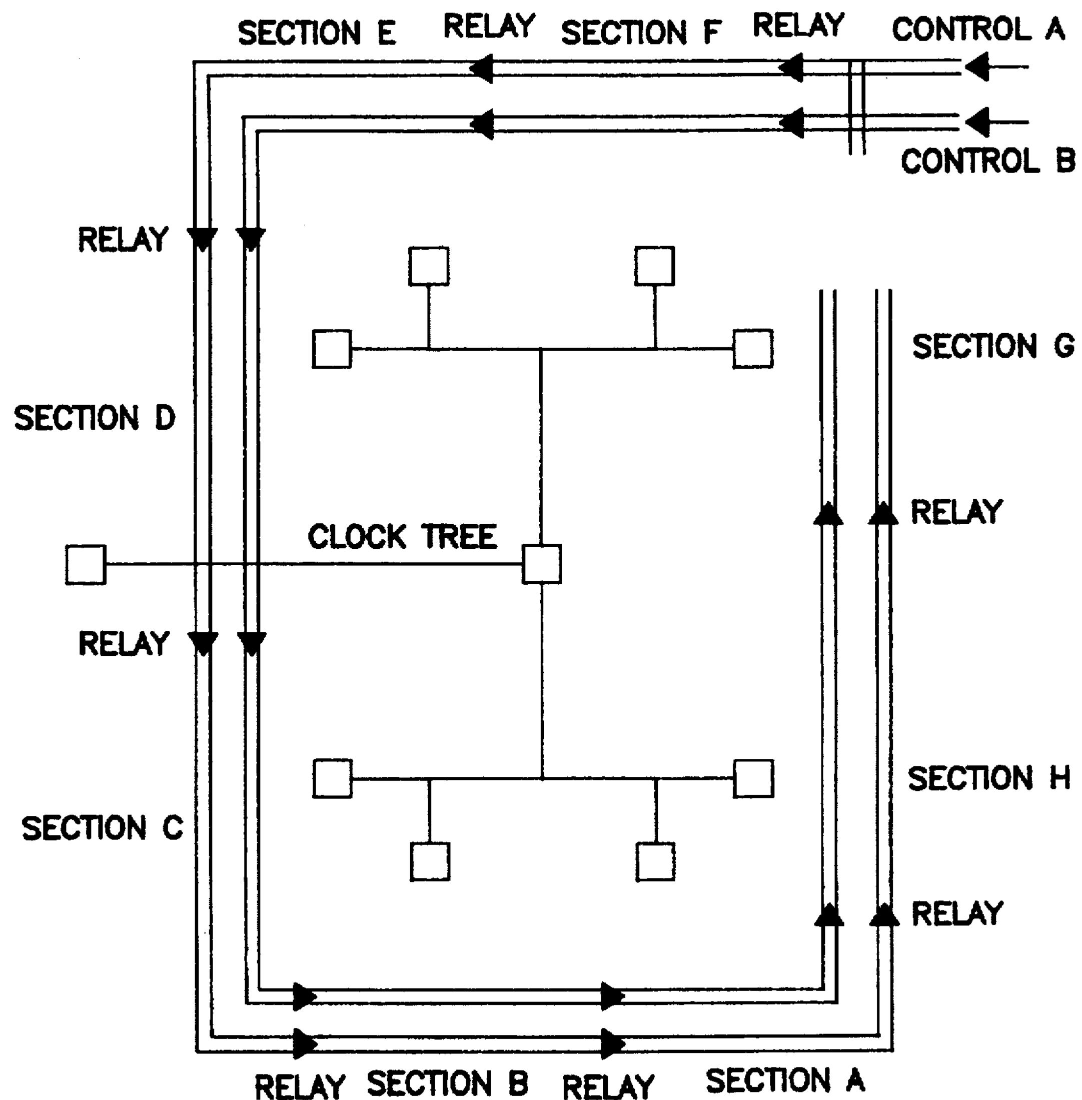
FIG. 4 shows control signal paths routed along the edge of the fanout circuit.

The third type of output cell can be turned on or off according to need. In the preferred embodiment, these cells are disabled in groups to provide varying output configurations. Two control signals are used in the preferred embodiment to disable a defined number of outputs. The control signals are carried on control paths routed along the edge of clock distribution circuit 300 of the present invention as shown in FIG. 4. The signals are routed around the periphery of clock distribution circuit 300 so that selected outputs from each group are disabled until the correct number of outputs is achieved, such that the enabled outputs are evenly distributed around the circuit. The two control signals allow for four possible output configurations. It shall be understood that a greater or lesser control signals could be used to arrive at a greater or lesser number of possible output configurations without departing from the scope of the present invention. An illustrative state assignment is shown in the following table:

| | Control B | Control A | Number of Active Outputs |
|---|---|---|---|
| (a) | 0 | 0 | 47 |
| (b) | 0 | 1 | 58 |
| (c) | 1 | 0 | 66 |
| (d) | 1 | 1 | 82 |

In configuration (a) as shown, the minimum number of outputs available is 47, thus for this example 47 output cells will be of the active type. The maximum configuration (d) has 82 outputs, thus 14 (96 minus 82) null load output cells would be present in this example. The remaining output cells (35) are of the third enable/disable type according to the table to form the four possible output configurations.

Those skilled in the art will readily appreciate that any state assignment and any appropriate number of active outputs could be arrived at according to the range of clock outputs required in a particular system, and that the above table and values listed therein are not intended to be limiting, but instead are merely one example of one way in which the invention may be practiced.

Figure 5:
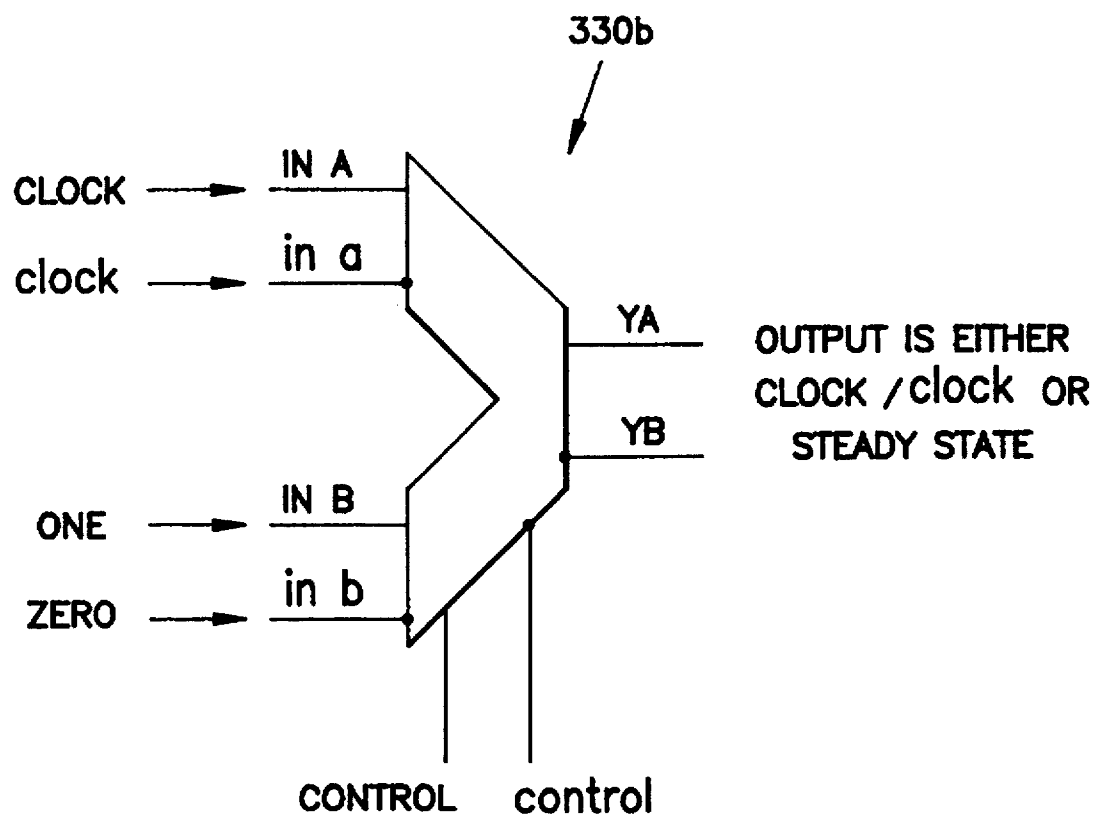
FIG. 5 shows the detailed circuit design for an enable/disable output cell.

FIG. 5 shows the circuit design for the third type of output cell, enable/disable cell **330*b*. The enable/disable cells 330*b* shown in FIG. 5** are essentially differential 2-to-1 multiplexors which have two states of operation, enabled and disabled. In the enabled state the differential clock signals connected to port A are passed through to the outputs. In the disabled state, the inputs connected to port B are hardwired to logical one for the true term and logical zero for the complement term. In the disabled state these inputs are passed through thus resulting in a steady state output. This capability to turn off outputs and evenly distribute enabled outputs around the fanout circuit which are not in use significantly reduces system noise by eliminating the toggling of outputs which will not be used by a particular board.

The clock system described above results in a maximum total skew of approximately ±100 picoseconds or less, as measured from the output of laser 106 to the clock inputs of the individual circuit board components 140. This allows for the use of a system clock frequency from 500 MHz to 1 GHz and beyond.

In addition, it shall be understood the maximum clock skew tolerated with the present system is not a limitation of the preferred embodiment of the clock system described herein, but rather is largely a limitation of the equipment used to measure the optical path length of the fibers, the mechanics of finely trimming optical fiber lengths and of equalizing the physical path lengths of the circuit board traces. As technology enables the measurement of smaller and smaller time intervals and the optical path length of fibers and the physical path length of circuit board traces can be measured with more precision, and as increases in the accuracy of trimming optical fiber lengths become available, the clock skew incurred with the present system could be reduced even further to allow even higher system clock frequencies to be achieved.

A clock distribution system and method has been disclosed wherein clock signals are transmitted to logic assemblies using optical fibers. The optical clock signals are converted into equivalent electrical signals at the logic assemblies. The preferred embodiment is capable of an adjustable clock rate between 500 MHz and 1 GHz, with a total system skew of less than or equal to ±100 picoseconds.

The foregoing description of the preferred embodiment of the invention has been presented for the purposes of illustration and description. It is not intended to be exhaustive or to limit the invention to the precise form disclosed. Many modifications and variations are possible in light of the above teaching. For example, any number of laser transmitters could be used to generate the optical clock of the present invention. If more equipment protection is desired, more redundancy could be added simply by increasing the number of oscillator-laser transmitter pairs.

Also, the 4×4 star and 1×32 tree couplers described herein and illustrated in the drawings as the preferred embodiment are merely one specific implementation of a preferred embodiment; other couplers having differing numbers of inputs and outputs could be used without departing from the spirit and scope of the present invention. These numbers will necessarily change depending on the number of destinations to which the clock signal must be sent. Also, although the maximum overall clock skew was described to be approximately ±100 picoseconds in the preferred embodiment, it shall be understood that this maximum skew is largely due not to limitations in the distribution system of the present invention, but rather to limitations in the equipment used to measure and tune the distribution paths. Thus as measurement and tuning technologies mature and are able to measure, display, and tune smaller and smaller time increments, the amount of skew inherent in the system of the present invention will also be reduced, all without departing from the scope of the present invention.

It is therefore intended that the scope of the invention be limited not by this detailed description, but rather by the claims appended hereto.

What is claimed is:

1. A clock system, comprising:

an optical subsystem, the optical subsystem comprising:

clock means for generating a system optical clock signal; and optical distribution means, connected to receive the system optical clock signal, for distributing the system optical clock signal over a plurality of equalized optical distribution paths and producing therefrom a plurality of deskewed optical clock signals; and an electrical subsystem, the electrical subsystem comprising:

a plurality of clock fanout circuits, each connected to a different one of the plurality of equalized optical distribution paths, each clock fanout circuit comprising:

input means, connected to receive one of the plurality of deskewed optical clock signals, for converting the deskewed optical clock signal into an equivalent electrical clock signal; and electrical distribution means, connected to receive the electrical clock signal, for distributing the electrical clock signal over a plurality of equalized electrical distribution paths and producing therefrom a plurality of deskewed electrical clock signals.

2. The clock system of claim 1 wherein the clock means further includes:

a plurality of clock signal means, each for producing an optical clock signal;

select means, connected to the plurality of clock signal means, for selecting one of the plurality of clock signal means to generate the system optical clock signal, the select means further for selecting a different one of the clock signal means in response to a failure of the selected clock signal means.

3. The clock system of claim 1 wherein the plurality of equalized optical distribution paths further include a plurality of optical fibers, wherein all of the plurality of optical fibers are of equivalent optical path length.

4. The clock system of claim 3 wherein the equalized optical distribution paths further include:

a first optical fiber, connected to receive the system optical clock signal;

a first coupler, connected to the first optical fiber, the first coupler having a first plurality of outputs;

a second plurality of optical fibers, each connected to receive a different one of the first plurality of outputs;

a plurality of second couplers, each connected to a different one of said second optical fibers, each of the second couplers having a second plurality of outputs; and a third plurality of optical fibers, each connected to a different one of the second plurality of outputs.

5. The clock system of claim 4 wherein the optical subsystem further includes means for tuning the second plurality of optical fibers and the third plurality of optical fibers to a first and second reference fiber, respectively, such that each of the second plurality of optical fibers are of equivalent optical path length, and such that each of the third plurality of optical fibers are of equivalent optical path length.

6. The clock system of claim 1 wherein each clock fanout circuit further includes a plurality of output cells each connected to a different one of the equalized electrical distribution paths.

7. The clock system of claim 6 wherein the plurality of output cells further includes a plurality of active output cell means, each connected to receive a different one of the plurality of deskewed electrical clock signals, for outputting the deskewed electrical clock signal to at least one integrated circuit.

8. The clock system of claim 6 wherein the plurality of output cells further includes a plurality of null load output cell means, each connected to receive a different one of the plurality of deskewed electrical clock signals, for providing a null load to balance the fanout of the clock fanout circuit.

9. The clock system of claim 6 wherein the plurality of output cells further includes a plurality of enable/disable output cell means, each connected to receive a different one of the plurality of deskewed electrical clock signals, for enabling or disabling an output under control of at least one control signal.

10. The clock of claim 1, further comprising output cell means, comprising a plurality of output cells, each connected to receive a different one of plurality of deskewed electrical clock signals and connected to output the deskewed electrical clock signal to one of a plurality of subsystem components.

11. The system of claim 10 wherein the output cell means further includes first output cell means for outputting the deskewed clock signals to the subsystem components.

12. The system of claim 10 wherein the output cell means further comprises second output cell means for providing a null input load to balance the fanout of the clock distribution system.

13. The system of claim 10 wherein the output cell means further includes third output cell means for enabling or disabling selected ones of said third output cell means under control of a plurality of control signals.

14. The system of claim 13 further including control paths connected to distribute the control signals to said third output cell means.

15. The system of claim 1 wherein the electrical distribution means further includes:

first distribution means, including a plurality of equalized first branches coupled to receive the clock signal, for splitting the clock signal to produce multiple first clock copies and for distributing each of the first clock copies along a different one of said first branches;

second distribution means, including a plurality of equalized second branches, connected to receive a different one of the first clock copies, for splitting each of the first clock copies to produce multiple second clock copies and for distributing each of the second clock copies along a different one of said second branches;

third distribution means, including a plurality of equalized third branches, each connected to receive a different one of the second clock copies, for splitting each of the second clock copies to produce multiple third clock copies and for distributing each of the third clock copies along a different one of the third branches; and a plurality of equalized distribution trees, coupled to receive a different one of the third clock copies, each tree having a plurality of terminating branches, wherein each of the distribution trees are of equivalent length.

16. The system of claim 15 wherein the first and second distribution means comprise an H-pattern.

17. An optical clock system for distributing an optical clock signal to a plurality of circuit boards in a computer system, comprising:

clock source means for generating the optical clock signal;

first coupler means, connected to receive the optical clock signal, for transmitting the optical clock signal to each of a plurality of optical fibers; and a plurality of second coupler means, each connected to a different one of the first plurality of optical fibers for transmitting the optical clock signal to each of a second plurality of optical fibers;

wherein each of the first plurality of optical fibers are tuned to a first reference fiber and wherein each of the second plurality of optical fibers are tuned to a second reference fiber.

18. The optical clock system of claim 17 wherein said first coupler means further includes n inputs, and wherein said clock source means further includes:

first laser transmitter means, connected to a first one of said n inputs, for generating a first optical clock signal;

second laser transmitter means, connected to a second one of said n inputs, for generating a second optical clock signal, wherein only one of said first laser transmitter means or second laser transmitter means is active at any one time; and switch means for switching between said first laser transmitter means and second laser transmitter means.

19. A clock distribution fanout circuit comprising:

clock distribution means for distributing a plurality of deskewed clock signals in multiple copies from a single source;

a plurality of control paths extending around the periphery of the fanout circuit and connected to distribute control signals;

a plurality of active output cells, each connected to receive a different one of the plurality of deskewed clock signals;

a plurality of null load output cells, each connected to receive a different one of the plurality of clock signals; and a plurality of enable/disable output cells, each connected to receive a different one of the plurality of clock signals, each further connected to receive the control signals, and responsive to the control signals to be in an enabled or a disabled state.

20. The circuit of claim 19 wherein the active, null/load and enable/disable output cell means are distributed evenly around the periphery of said circuit.

* * * * *